(12) United States Patent
Devnath et al.

(10) Patent No.: US 9,544,332 B2
(45) Date of Patent: Jan. 10, 2017

(54) METHOD AND SYSTEM FOR NETWORK SERVICE HEALTH CHECK AND LOAD BALANCING

(71) Applicant: Aruba Networks Inc., Sunnyvale, CA (US)

(72) Inventors: Sandip Kumar Devnath, Bangalore (IN); Santashil PalChaudhuri, West Bengal (IN); Sudeepto Kumar Roy, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 299 days.

(21) Appl. No.: 14/068,833

(22) Filed: Oct. 31, 2013

(65) Prior Publication Data

US 2015/0120911 A1 Apr. 30, 2015

(51) Int. Cl.
*G06F 15/16* (2006.01)
*H04L 29/06* (2006.01)
*H04L 12/26* (2006.01)
*H04L 29/08* (2006.01)
*G06F 3/12* (2006.01)

(52) U.S. Cl.
CPC ............... *H04L 63/20* (2013.01); *H04L 43/08* (2013.01); *H04L 43/0817* (2013.01); *H04L 43/16* (2013.01); *H04L 67/1008* (2013.01); *H04L 67/1044* (2013.01); *G06F 3/121* (2013.01); *G06F 3/1205* (2013.01); *G06F 3/1232* (2013.01); *G06F 3/1296* (2013.01); *H04L 43/10* (2013.01)

(58) Field of Classification Search
CPC .......... H04L 43/16; H04L 43/08; H04L 63/20; H04L 67/1008; H04L 67/1044; G06F 3/1205; G06F 3/121; G06F 3/1296; G06F 3/1232
See application file for complete search history.

(56) References Cited

U.S. PATENT DOCUMENTS

| 5,068,806 | A | * | 11/1991 | Gatten | B41J 2/17566 347/7 |
| 5,663,750 | A | * | 9/1997 | Sakuma | B41J 2/17566 347/14 |
| 5,682,183 | A | * | 10/1997 | Wade | B41J 2/04506 347/19 |

(Continued)

*Primary Examiner* — Krista Zele
*Assistant Examiner* — Anthony Fabbri
(74) *Attorney, Agent, or Firm* — Hewlett Packard Enterprise Patent Department

(57) ABSTRACT

A non-transitory computer readable medium includes instructions which, when executed by one or more network devices, causes performance of operations. The operations include sending, to shared devices, one or more status queries regarding one or more device conditions for each of the shared devices, obtaining responses to the one or more status queries from each of the plurality of shared devices, the responses including the one or more device conditions for each of the shared devices, filtering the shared devices based on the one or more device conditions to obtain a subset of the shared devices, identifying the subset of the shared devices as a set of available shared devices, and transmitting information identifying the set of available shared devices to a client device.

20 Claims, 3 Drawing Sheets

(56) References Cited

U.S. PATENT DOCUMENTS

| | | | | |
|---|---|---|---|---|
| 5,694,156 A * | 12/1997 | Hoisington | B41J 2/025 | 347/5 |
| 5,852,946 A * | 12/1998 | Cowger | B41J 2/17566 | 222/64 |
| 6,408,407 B1 * | 6/2002 | Sadler | G06F 11/0793 | 714/2 |
| 6,622,260 B1 * | 9/2003 | Marisetty | G06F 11/0724 | 714/10 |
| 6,687,846 B1 * | 2/2004 | Adrangi | G06F 11/0709 | 714/17 |
| 6,746,094 B1 * | 6/2004 | Powell | G06K 15/02 | 347/14 |
| 6,761,422 B2 * | 7/2004 | Smith, II | B41J 29/393 | 347/14 |
| 7,124,326 B1 * | 10/2006 | Niikawa | H04N 17/002 | 348/E17.002 |
| 7,188,918 B2 * | 3/2007 | Childers | B41J 2/17509 | 347/19 |
| 7,225,263 B1 * | 5/2007 | Clymer | H04L 63/101 | 709/217 |
| 7,296,192 B2 * | 11/2007 | Breitling | G06Q 10/00 | 705/35 |
| 7,370,244 B2 * | 5/2008 | Breitling | G06Q 10/00 | 714/15 |
| 7,536,118 B2 * | 5/2009 | Sippel | G03G 15/55 | 399/18 |
| 7,836,357 B2 * | 11/2010 | Fischer | G06F 11/0709 | 714/21 |
| 7,971,945 B2 * | 7/2011 | Tsukada | B41J 2/17566 | 347/19 |
| 8,228,535 B2 * | 7/2012 | Nimura | B41J 2/17566 | 347/6 |
| 8,526,885 B2 * | 9/2013 | Lin | H04M 1/7253 | 340/12.51 |
| 9,231,977 B2 * | 1/2016 | Biswas | H04L 63/20 | |
| 2003/0204619 A1 * | 10/2003 | Bays | 709/238 | |
| 2004/0122832 A1 * | 6/2004 | Heil | G06F 11/1464 | |
| 2005/0154758 A1 * | 7/2005 | Childress et al. | 707/104.1 | |
| 2005/0232253 A1 * | 10/2005 | Ying | H04L 29/06027 | 370/356 |
| 2007/0094141 A1 * | 4/2007 | Viavant | H04L 63/105 | 705/51 |
| 2008/0043622 A1 * | 2/2008 | Kamath et al. | 370/235 | |
| 2008/0215454 A1 * | 9/2008 | Haines | G06Q 10/087 | 705/26.2 |
| 2008/0225722 A1 * | 9/2008 | Khemani et al. | 370/235 | |
| 2009/0327327 A1 * | 12/2009 | Sathish | H04L 63/102 | |
| 2010/0088410 A1 * | 4/2010 | Ridley | 709/224 | |
| 2010/0131946 A1 * | 5/2010 | Degaonkar et al. | 718/1 | |
| 2010/0188975 A1 * | 7/2010 | Raleigh | G06Q 10/06375 | 370/230.1 |
| 2011/0069613 A1 * | 3/2011 | Phillips et al. | 370/229 | |
| 2012/0026870 A1 * | 2/2012 | Challa | H04L 41/046 | 370/230 |
| 2012/0200391 A1 * | 8/2012 | Sugiyama | G06F 21/32 | 340/5.82 |
| 2013/0132545 A1 * | 5/2013 | Schultze | H04L 41/00 | 709/223 |
| 2013/0167196 A1 * | 6/2013 | Spencer | H04W 8/22 | 726/3 |
| 2013/0254375 A1 * | 9/2013 | Agiwal | H04L 43/0882 | 709/224 |
| 2015/0019710 A1 * | 1/2015 | Shaashua | H04L 43/10 | 709/224 |
| 2015/0222508 A1 * | 8/2015 | Kruglick | H04L 41/142 | 709/224 |

* cited by examiner

METHOD AND SYSTEM FOR NETWORK SERVICE HEALTH CHECK AND LOAD BALANCING

CROSS REFERENCE TO RELATED APPLICATIONS

This application is related to U.S. patent application Ser. No. 14/068,802, filed on Oct. 31, 2013, entitled "Method and System for Controlling Access to Shared Devices" in the names of David Lee Wilson, Sandip Kumar Devnath, Anandakrishnan Viswanathan, Santashil Palchaudhuri, and Sudeepto Kumar Roy and commonly owned by the same assignee. U.S. patent application Ser. No. 14/068,802 is incorporated herein by reference in its entirety.

BACKGROUND

Computer networks allow users to connect to other users and to various services. For example, a client device may request a service, on behalf of a user, from a shared device that is shared amongst multiple users and multiple client devices. The service may be to provide content and/or to perform an action. In order to request a service from a particular shared device, a determination may be made as to which shared devices are available to the client device.

OVERVIEW

In general, in one aspect, embodiments relate to a non-transitory computer readable medium including instructions which, when executed by one or more network devices, causes performance of operations. The operations include sending, to shared devices, one or more status queries regarding one or more device conditions for each of the shared devices, obtaining responses to the one or more status queries from each of the plurality of shared devices, the responses including the one or more device conditions for each of the shared devices, filtering the shared devices based on the one or more device conditions to obtain a subset of the shared devices, identifying the subset of the shared devices as a set of available shared devices, and transmitting information identifying the set of available shared devices to a client device.

In general, in one aspect, embodiments relate to a non-transitory computer readable medium that includes instructions which, when executed by one or more network devices, causes performance of operations. The operations include receiving, from a client device, a request for particular service, identifying shared devices that include functionality to provide the particular service, determining a load for one or more shared devices of the shared devices, and selecting, from the shared devices, a set of shared devices to present to the client device. The selecting operation includes one or more of filtering the shared devices to obtain the set of shared devices based on the load for the one or more shared devices, and ordering the shared devices to obtain the set of shared devices based on the load for the one or more shared devices. The operations further include transmitting information identifying the set of shared devices to the client device for a selection, by the client device, of a particular shared device to perform the particular service.

In general, in one aspect, embodiments relate to a system that includes a network device including a hardware processor. The system is configured to perform operations that include sending, to shared devices, one or more status queries regarding one or more device conditions for each of the shared devices, and obtaining responses to the one or more status queries from each of the shared devices, the responses including the one or more device conditions for each of the shared devices. The operations further include filtering the shared devices based on the one or more device conditions to obtain a subset of the shared devices, identifying the subset of the shared devices as a set of available shared devices, and transmitting information identifying the set of available shared devices to a client device.

In general, in one aspect, embodiments relate to a non-transitory computer readable medium that includes computer readable program code including instructions for receiving, from a client device, a request for particular service, identifying shared devices that include functionality to provide the particular service, determining a load for one or more shared devices of the shared devices, selecting, from the shared devices, a set of shared devices to present to the client device. The selecting operation includes one or more of filtering the shared devices to obtain the set of shared devices based on the load for the one or more shared devices, and ordering the shared devices to obtain the set of shared devices based on the load for the one or more shared devices. The operations further include transmitting information identifying the set of shared devices to the client device for a selection, by the client device, of a particular shared device to perform the particular service.

Other aspects will be apparent from the following description and the appended claims.

DETAILED DESCRIPTION

Figure 1:
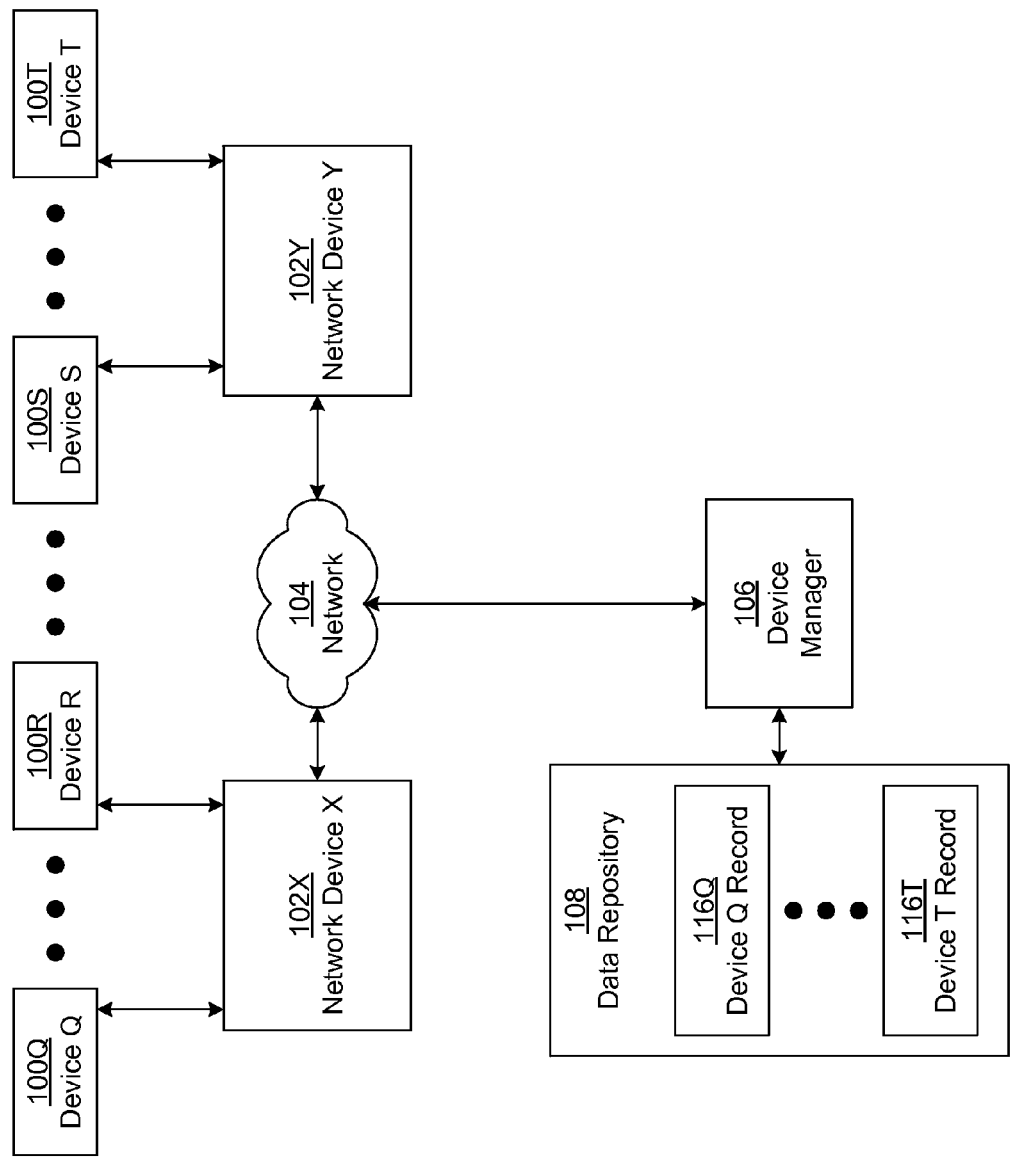
FIG. 1 shows a schematic diagram of a system in accordance with one or more embodiments.

Specific embodiments will now be described in detail with reference to the accompanying figures. Like elements in the various figures are denoted by like reference numerals for consistency. In the figures, three co-linear dots indicate that additional items of similar type to the preceding and succeeding items with respect to the dots may optionally exist.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

As used herein, a user refers to a person, department, business entity, organization, or other group that is responsible for a device. For example, a user may own or lease a device. By way of some example users, a user may be an Information Technology (IT) department. A client device user is a user who is responsible for a client device. A shared device user is a user who is responsible for a shared device. By way of an example, through the client device, a client device user may use the services of a shared device, which is owned by an IT department. In the example, the shared device user is the IT department. Additionally, a user is deemed to perform an action when an individual, group, or hardware device performs an action on behalf of the user in one or more embodiments.

In general, embodiments provide a method, system, and computer readable medium for presenting shared devices. Specifically, one or more embodiments identify a set of allowed shared devices that may be used by a user of a client device and present the set to the client device. In one or more embodiments, the set of allowed shared devices may be based on one or more device conditions of the devices and/or based on the load of the devices.

FIG. 1 shows a schematic diagram of a system in accordance with one or more embodiments. As shown in FIG. 1, the system includes devices (e.g., device Q (100Q), device R (100R), device S (100S), device T (100T)), network devices (e.g., network device X (102X), network device Y (102Y)), a network (104), a device manager (106), and a data repository (108). Each of these components is discussed below in accordance with one or more embodiments.

In one or more embodiments, a device (e.g., device Q (100Q), device R (100R), device S (100S), device T (100T)) is a hardware component that receives a service from another device of the system and/or provides a service to another device of the system. Specifically, when the device receives a service, the device may be referred to as a client device with respect to the service. When a device provides a service, the device may be referred to as a shared device with respect to the service. A shared device is a device that provides services to at least one client device. If the shared device provides services to multiple client devices, the services may or may not be provided at the same time. In one or more embodiments, each particular device (e.g., device Q (100Q), device R (100R), device S (100S), device T (100T)) in FIG. 1 may be a client device and a non-shared device, a shared device and a non-client device, or both a client device and a shared device.

Each shared device may include functionality to perform a corresponding service, but may or may not be currently capable of performing the service. In other words, a shared device includes functionality to perform a service when, at least at one point in time, the shared device is capable of performing the service regardless of whether a device is currently capable of performing the service. Whether a device is currently capable of performing a service is based on one or more device conditions. In other words, the device condition(s) is the current status of the device as to whether the device may perform the service. The device condition may include a hardware, software, or supply defect in the device or to a current load of the device with respect to a number of jobs or size of jobs being performed by the device. For example, for a printer, the device conditions may include whether the printer has ink, whether the printer has paper, whether the printer is turned on, the amount of the load on the printer (e.g., number and/or size of the print jobs), whether the printer is blocked by a paper jam, whether a software bug exists for the printer, or other status of the printer.

In one or more embodiments, a device (e.g., device Q (100Q), device R (100R), device S (100S), device T (100T)) may be one or more mobile devices (e.g., laptop computer, smart phone, personal digital assistant, tablet computer, or other mobile device), gaming console, desktop computers, servers, blades in a server chassis, or any other type of electronic device or devices that includes at least the minimum processing power, memory, and input and output device(s) to perform one or more embodiments. For example, the device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The device may also include one or more input device(s), such as a touchscreen, keyboard, mouse, microphone, touchpad, electronic pen, or any other type of input device. Further, the device may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely (e.g., via the network) connected to the hardware processor(s), memory, and storage device(s). Many different types of devices exist, and the aforementioned input and output device(s) may take other forms.

The device may be connected to a network (104) via a network interface connection (not shown) and a network device (e.g., network device X (102X), network device Y (102Y)). The network (104) may be a local area network (LAN), a wide area network (WAN) such as the Internet, mobile network, or any other type of network, or a combination of networks.

A network device (e.g., network device X (102X), network device Y (102Y)) is a digital hardware device that may be communicatively coupled to the network (104). By way of an example, a client device may be directly wired or wirelessly communicatively connected to a single access point, which is directly communicatively connected to a single controller, which is connected to the network (e.g., network (104)). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

An access point is a separate hardware unit from device that is directly, wired or wirelessly, connected to the device and is in a communication path from the device to the network. In other words, the access point may be directly connected via the direct wired/wireless connection to a network interface card on the device (e.g., device Q (100Q), device R (100R), device S (100S), device T (100T)). Further, access points may be directly connected to the network (104) or connected to the network (104) via a controller. By way of an example, the access point may include a wireless access point (WAP) that communicates wirelessly with devices using Wi-Fi, Bluetooth or related standards and that communicates with a wired network.

Each network device may be connected to any number of devices at any moment in time. Specifically, each network device may be connected to no devices, a single device, or multiple devices at any particular moment in time. Further, the number of devices connected to a network device may be heterogeneous amongst network devices.

In one or more embodiments, a network device includes functionality to issue status queries to the device and receive one or more device conditions from the device. The network device may further include functionality to detect the load on the device. Detecting the load may be in response to the query or based on analyzing packets that are intercepted by the network device to the device. In one or more embodiments, the network device may include functionality to make a decision whether a client device may use a particular shared device based on the device condition(s) and/or load, and deny access and/or not expose the shared device to the client device based on the decision.

Continuing with FIG. 1, the network devices (e.g., network device X (102X), network device Y (102Y)) may be operatively connected, continuously or intermittently, directly or via the network, to a device manager (106). The device manager (106) may correspond to a computing system or execute on a computing system and cause the computing system to manage device records (e.g., device Q Record (110Q), device T Record (110T)).

The computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, the computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system may be connected to a network (104) (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing systems exist, and the aforementioned input and output device(s) may take other forms. Further, one or more elements of the aforementioned computing system may be located at a remote location and connected to the other elements over a network.

Continuing with FIG. 1, the device manager (106) is connected to a data repository (108). In one or more embodiments, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. Further, the data repository may be or may execute on the same computing system as device manager (106). Alternatively or additionally, the data repository (108) may be on a separate computing system.

The data repository (108) includes functionality to store device records (e.g., device Q record (110Q), device T record (110T)) for each device connected to a network device (e.g., network device X (102X), network device Y (102Y)) in the system. A device record (e.g., device Q record (110Q), device T record (110T)) is information about a device. Any mechanism may be used to store a device record without departing from the scope of the claims. In particular, a device record may be a file, a database record, an entry or row in a table, or another data structure. A device Q record (104) may include, for example, a device address (118) and a user profile (120) in accordance with one or more embodiments.

A device address (118) is a unique identifier for a device. For example, the device address may be a media access control (MAC) address, a serial number of the device, or another unique identifier of the device.

In one or more embodiments, the user profile corresponds to information about a user of the device. A user profile may include a user identifier. A user identifier is a unique identifier of a user. The user identifier may be a single piece of identification (e.g., tax identifier, login name, email address, a system assigned unique identifier) or combination of identifiers (e.g., combination of mailing address and name, combination of name and birthdate, or other combination).

Although not shown in FIG. 1, software instructions in the form of computer readable program code to perform embodiments may be stored, in whole or in part, temporarily or permanently, on a non-transitory computer readable medium, such as a CD, DVD, storage device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the network device (e.g., network device X (102X), network device Y (102Y)), the device manager (106), the data repository (108), and/or another component.

While FIG. 1 shows a configuration of components, other configurations may be used without departing from the scope of the claims. For example, various components may be combined to create a single component. As another example, the functionality performed by a single component may be performed by two or more components.

Figure 2:
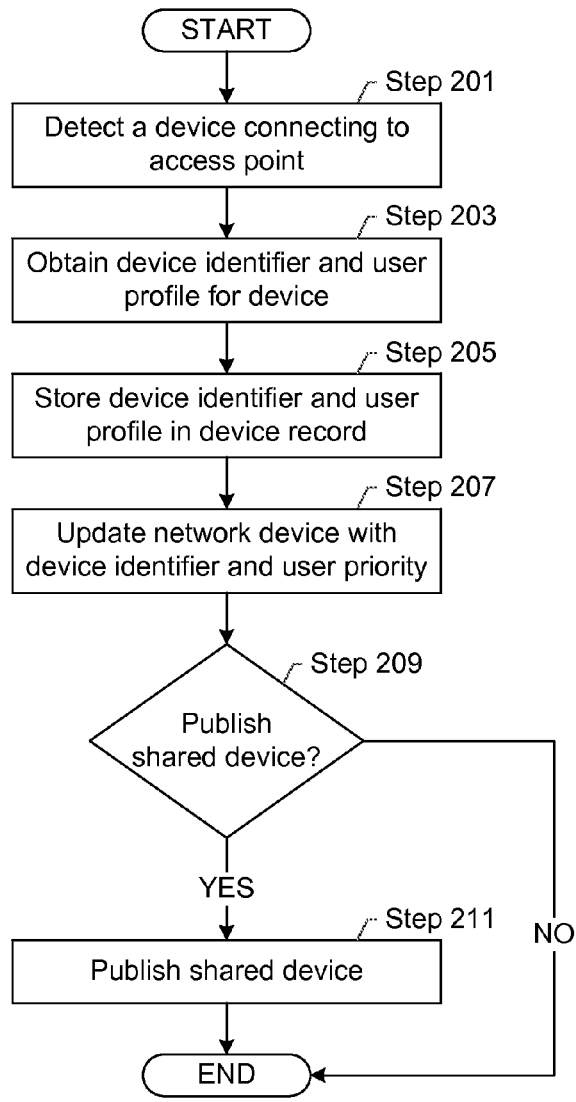
FIGS. 2, 3, and 4 show flowcharts in accordance with one or more embodiments.
Figure 3:
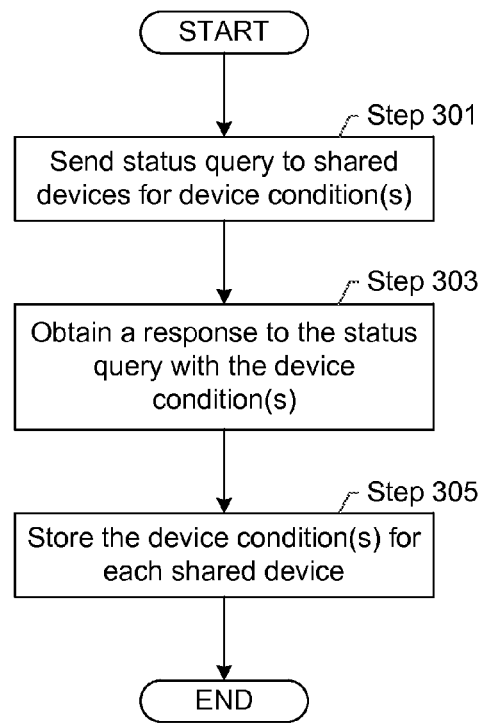
Figure 4:
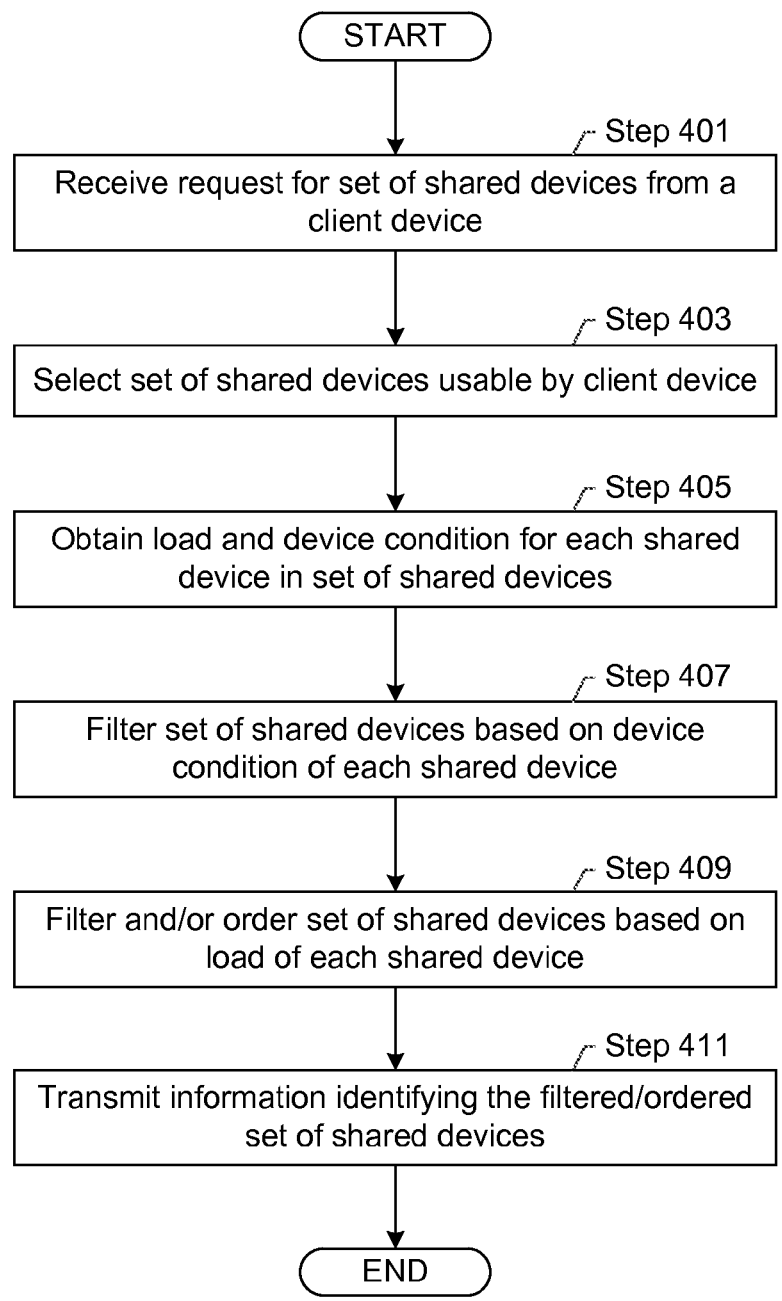

FIGS. 2-4 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

Turning to FIG. 2, FIG. 2 shows a flowchart for adding a new device to the system in accordance with one or more embodiments. In Step 201, a device connecting to a network device is detected in accordance with one or more embodiments. As part of establishing the connection, the network device may determine, such as based on the MAC address of the device, that the device is a new device. A new device may be a device that does not have a device record stored in the data repository. In one or more embodiments, determining that the device is a new device may include the network device checking a data repository located on the network device for the device, and, if not found, sending a request to the device manager to determine whether any device record exists for the device. If no device record exists, then the device may be deemed a new device. Step 201 may be omitted, for example, if a device record is manually created for the device prior to a first access by the device to any network device.

In Step 203, a device identifier and a user profile are obtained for the device. In one or more embodiments, the device identifier may be submitted by a user using a user interface, such as a user interface of the device manager or network device. Alternatively, the device identifier may be obtained from the device. In one or more embodiments, the user profile may be obtained from a user using a user interface. For example, if the user is associated with another existing device, the user profile may already be in the data repository and an identifier of the user profile is obtained. In the example, the identifier of the user profile may be obtained from the user in one or more embodiments. By way of another example, if the user is not associated with another device, the user may register with the system. Registration may include the user providing administrative information (e.g., name, address, user identifier, role or job title of the user), and any other information. Alternatively, an administrator or other individual may submit all or part of the administrative information for the user. The user and/or other individual may submit the user profile using the device or another device connected to the system.

In Step 205, the device identifier and the user profile are stored in a device record. In one or more embodiments, an existing device record may be modified or a new device record may be created with the device identifier and user profile. In Step 205, the storage may be performed by the network device and transmitted to the data repository. In one or more embodiments, the storage may be performed by the device manager.

In Step 207, the network device is updated with the device identifier and user priority. Specifically, if the network device does not have the device identifier and user priority, then the device identifier and user priority may be sent to the network device. Accordingly, the network device may update local memory to include the device identifier and/or user priority.

In Step 209, a determination is made whether to publish the device in accordance with one or more embodiments. In one or more embodiments, the shared device is published when device is a shared device and the device is to be immediately shared with one or more client devices. In other words, publishing the shared device establishes to other network devices, that the shared device includes functionality to perform a service.

If a determination is made to publish the shared device, then the shared device is published in Step 211. In one or more embodiments, publishing includes transmitting information about the shared device to network devices for enforcement.

Continuing with FIG. 2, when a device record for the shared device is stored in the data repository, the data repository, device manager, network devices, or other unit or combination thereof may monitor the shared device policies to ensure that the sharing policies that are used are current.

FIG. 3 shows a flowchart for obtaining device conditions of one or more shared devices in accordance with one or more embodiments. In Step 301, a status query for device condition(s) is sent to the shared devices. The status query may be sent by a network device to one or more shared devices that use the network device to connect to the network. In one or more embodiments, the network device may send the status query periodically and/or in response to a request from a client device. For example, a status query may be sent according to a regular period of time such that upon the expiration of the period, the network device sends the status query. By way of another example, when the client device requests a particular service, the network device may send the status query to the various shared devices that include functionality to offer the service. The status query may include a request for one or more particular device conditions. For example, the status query may be a request for any device condition that is a defect and/or the load of the device. By way of another example, the status query may be for any device condition that prohibits the device from operating, such as a printer being out of paper or having a paper jam. In one or more embodiments, the status query may include an identifier of the type of device condition for the response to the status query. In other words, the identifier may identify the type of device conditions to respond to the status query.

Continuing with FIG. 3, in Step 303, a response to the status query is received with the device conditions. In one or more embodiments, the shared device sends identifiers of the one or more device conditions to the network device. The identifier may be a string of bits, for example, where each bit indicates functioning or not functioning and the position of the bit identifies the particular device condition. By way of another example, the identifier may be a keyword value pair, whereby the keyword identifies the device condition and the value indicates functioning or not functioning.

In Step 303, the device conditions are stored in accordance with one or more embodiments. The device conditions may be stored on the network device that is interposed between the shared device and the network, transmitted and stored to other network devices, and/or transmitted and stored in the data repository. By storing the device conditions, the device conditions may be used to determine whether to expose a shared device to a client device.

FIG. 4 shows a flowchart for presenting shared devices to a client device in accordance with one or more embodiments. In one or more embodiments of the invention, the steps of the flowchart of FIG. 4 may be used to perform load balancing, such as by ordering shared devices according to the load on the shared devices.

In Step 401, a request for a set of allowed shared devices is received from a client device in accordance with one or more embodiments. For example, the client device may associate with a network device. Subsequent to the association, such as after or as a part of the association, the request for shared devices may be received. The request may be for all shared devices. Alternatively, the request may be for a subset of shared devices, such as shared devices having certain properties or offering particular services.

In Step 403, a set of shared devices usable by the client device is selected in accordance with one or more embodiments. In one or more embodiments, the set of shared devices may be all shared devices or shared devices satisfying initial filtering criteria. For example, the set of shared devices may be shared devices that satisfy preliminary location criteria (e.g., in the same building as the network device, on the same floor as the network device, or other preliminary criteria), offer the services requested by the client in the request, or other filtering criteria.

In one or more embodiments, the network device may obtain the set of shared devices. For example, the network device may access local memory, such as a memory device in the network device or physically and directly connected to the network device, to obtain the set of shared devices. Alternatively or additionally, the network device may send a request to the data repository for the set of shared devices. Other components of the system may obtain the set of shared devices without departing from the scope of the claims.

In Step 405, the load and one or more device conditions of the shared device are obtained in accordance with one or more embodiments. The load may be obtained by intercepting requests and responses to the shared device. From the requests and responses, various metrics defining the load may be extracted. For example, a determination may be made as to the size of the request (e.g., the amount of data being sent to the shared device to process, the amount of data being provided by the shared device), the number of open sessions with the shared device, the number of requests to the device, amount of time between a received request and a response to the request, and other metrics. The device conditions may be obtained as discussed above in FIG. 3, or if already gathered from the shared device, then from memory.

In one or more embodiments, the network device, or another component, further filters the set of shared devices. Specifically, in Step 407, the set of shared devices are filtered based on the device conditions. In other words, any shared device that has a device condition indicating a defect may not be exposed to the client device. Thus, the client device is not able to view or see information about devices that is not currently capable of processing the client's request. To filter the set of shared devices, a determination is made, for each device condition of the shared device, whether the device condition would prohibit the shared device from processing the request. The determination may be based, for example, on rules defined at the network device. By way of an example, a device condition of a printer of being low on ink may not be cause to filter the printer, but a device condition of out of paper or out of ink may be cause to filter the printer.

Further, whether the device condition causes the filtering of the device may be based on the user of the client device. For example, if a user has permission to correct the particular defect of the shared device reflected in the device condition, the shared device may not be filtered. Thus, a user that may remove a paper jam on the printer may be able to view printers that have paper jams whereas a user that is not provided with the permission to remove paper jams may not view printers that have paper jams.

In Step 409, the set of shared devices are filtered and/or ordered based on the load of each shared device. In other words, the shared devices may be filtered to remove shared devices that do not satisfy a load threshold (e.g., one or more of the load metrics indicate a greater load than the load threshold). Alternatively or additionally, all or part of the remaining shared devices may be ordered according to load on the shared devices. Thus, information about less busy shared devices may be at a top of a list of shared devices whereas busier shared devices may be at the bottom of the list.

In Step 411, information identifying the filtered and/or ordered set of shared devices is transmitted to the client device. In one or more embodiments, the network device transmits to the client device information identifying each shared device in the filtered and/or ordered set. The information may include, for example, the name of the shared device, the location of the shared device, an address of the shared device, devices conditions about the shared device, the current load of the shared device. By first filtering the set of shared devices that are not currently capable of processing the request from the client device, the client device is not needlessly exposed to such shared devices.

The following example is for explanatory purposes only and not intended to limit the scope of the claims. In the following example, consider the scenario in which a business has multiple employees with various roles. Employees that are network administrators may view all shared devices, office service employees may view printers that have defects with respect to supplies and any other shared device that does not have defects, and ordinary remaining employees may view only shared devices that are currently capable of processing requests.

Continuing with the example, the business has six printers (i.e., printer U, printer V, printer W, printer X, printer Y, and printer Z) throughout the business. Generally, the printers are not busy and may be used by any employee. Bob, an ordinary employee who is in the publishing side of the business, sent a request using his client device to printer U to print hundreds of brochures for the business. Also, when the various network devices send out status queries, printer X responds that printer X is out of paper, and printer Y responds that printer Y has a software defect. At this stage, the various device conditions are shared amongst the network devices.

Jan, also an ordinary employee, used her client device to obtain a list of printers that are available because she would like to send a print job having some detailed images. The network device connected to printer U has informed the remaining network devices of the business that printer U is processing a heavy load. Thus, the network device connected to Jan's client device does not expose printer U because printer U failed to satisfy the load threshold. Further, because Jan is an ordinary employee, the network device does not expose printer X or printer Y because neither printer is currently capable of performing the print job. Thus, the list of printers sent to Jan's client device from which Jan may choose a printer include only printer V, printer W, and printer Z. Jan selects printer V to print her print job.

Continuing with the example, Otto, in office services, would like to obtain a list of printers using Otto's client device to print memos to each of the employees. Because printer U failed to satisfy the load threshold, the network device connected to Otto's client device does not expose printer U. However, because Otto is in office services, Otto may view printer X, which is out of paper, and not printer Y, which has the software defect. Further, although Jan is using printer V, printer V does satisfy the load threshold. Thus, printer V is also exposed to Otto, but sent at the end of the list. Thus, the list of printers sent to Otto's client device from which Otto may choose a printer include only the following printers and is ordered as follows: printer W, printer Z, printer X, and printer V. Otto selects printer W to print his print job.

Alan, a network administrator, would like to send a print job to a printer using Alan's device. Because Alan is a network administrator, Alan may view all printers. However, the printers are ordered according to load and current capability. Thus, the list of printers sent to Alan's client device from which Alan may choose a printer include only the following printers and is ordered as follows: printer Z, printer W, printer X, printer V, printer Y, and printer U.

As shown in the example, one or more embodiments order and/or filter the way shared devices are exposed to the client device based on device condition and load and the role of the user using the client device. Thus, a client device may select a shared device that is currently capable of processing the request.

While embodiments have been described with respect to a limited number of embodiments, those skilled in the art, having benefit of this disclosure, will appreciate that other embodiments can be devised which do not depart from the scope of the claims as disclosed herein. Accordingly, the scope of the claims should be limited only by the attached claims.

What is claimed is:

1. A non-transitory computer readable medium comprising instructions which, when executed by one or more network devices, causes the one or more network devices to:
send, to a plurality of shared printer devices, one or more status queries regarding one or more device conditions for each of the plurality of shared printer devices;
obtain responses to the one or more status queries from each of the plurality of shared printer devices, the responses comprising the one or more device conditions for each of the plurality of shared printer devices;
determine whether the one or more device conditions prohibit a subset of the plurality of shared printer devices from processing a request for a particular service from a user of a client device;
determine whether the user has permission to correct the one or more device conditions;
filter the plurality of shared printer devices to exclude the subset of the plurality of shared printer devices in response to (1) the one or more device conditions prohibiting the subset of the plurality of shared printer devices from processing the request from the user, and (2) the user not having permission to correct the one or more device conditions;
identify the filtered plurality of shared printer devices as a set of available shared printer devices for the user; and
transmit information identifying the set of available shared printer devices to the client device.

2. The non-transitory computer readable medium of claim 1, wherein the instructions are further to cause the one or more network devices to receive a selection, from the client device, of one of the set of available shared printer devices to perform the particular service requested by the client device.

3. The non-transitory computer readable medium of claim 1, wherein the instructions are further to cause the one or more network devices to determine whether the user has permission to correct the one or more device conditions based on a role of the user in a user profile.

4. The non-transitory computer readable medium of claim 1, wherein the instructions are further to cause the one or more network devices to send the one or more status queries periodically or in response to expiration of a time period associated with stored status information.

5. The non-transitory computer readable medium of claim 1, wherein the instructions are further to cause the one or more network devices to:
receive, from the client device, the request for the particular service;
determine that each of the plurality of shared printer devices includes functionality to provide the particular service prior to sending the one or more status queries.

6. The non-transitory computer readable medium of claim 1, wherein the instructions are further to cause the one or more network devices to:
dynamically select the one or more device conditions based on the request received from the client device for the particular service.

7. The non-transitory computer readable medium of claim 1, wherein the instructions further cause the one or more network devices to:
determine a load for the plurality of shared printer devices;
filter the plurality of shared printer devices based at least on the determined load for the plurality of shared printer devices.

8. The non-transitory computer readable medium of claim 7, wherein to determine the load for the plurality of shared printer devices, the instructions are further to cause the one or more network devices to transmit a status query to the plurality of shared printer devices for the load of the plurality of shared printer devices.

9. The non-transitory computer readable medium of claim 8, wherein the instructions are further to cause the one or more network devices to:
send the status query based on a load associated with the particular service.

10. The non-transitory computer readable medium of claim 7, wherein the instructions are further to cause the one or more network devices to determine the load for the plurality of shared printer devices responsive to a determination that a session exists with each of the plurality of shared printer devices or a determination that data is being transmitted to the plurality of shared printer devices from another client device.

11. The non-transitory computer readable medium of claim 7, wherein to filter the plurality of shared printer devices, the instructions are further to cause the one or more network devices to filter the plurality of shared printer devices based on the one or more device conditions, the load for the plurality of shared printer devices, and a role of the user to obtain the filtered plurality of shared printer devices.

12. The non-transitory computer readable medium of claim 7, wherein the instructions are further to cause the one or more network devices to:
order the identified set of available shared printer devices in an order from smallest load to largest load and to transmit information identifying the set of available shared printer devices according to the ordered arrangement of the set of available shared printer devices.

13. A network device comprising:
a hardware processor;
a memory on which is stored machine readable instructions that are to cause the hardware processor to:
send, to a plurality of shared printer devices, one or more status queries regarding one or more device conditions for each of the plurality of shared printer devices,
obtain responses to the one or more status queries from each of the plurality of shared printer devices, the responses comprising the one or more device conditions for each of the plurality of shared printer devices;
determine whether the one or more device conditions prohibit a subset of the plurality of shared printer devices from processing a request for a particular service from a user of a client device;
determine whether the user has permission to correct the one or more device conditions;

filter the plurality of shared printer devices to exclude the subset of the plurality of shared printer devices in response to (1) the one or more device conditions prohibiting the subset of the plurality of shared printer devices from processing the request from the user, and (2) the user not having permission to correct the one or more device conditions;

identify the filtered plurality of shared printer devices as a set of available shared printer devices for the user, and transmit information identifying the set of available printer shared devices to a client device.

14. The network device of claim 13, wherein the machine readable instructions are further to cause the hardware processor to determine whether the user has permission to correct the one or more device conditions based on a role of the user in a user profile.

15. The network device of claim 13, wherein the memory on which is stored machine readable instructions that are to further cause the hardware processor to:

determine a load for the plurality of shared printer devices;

filter the plurality of shared printer devices based at least on the determined load for the plurality of shared printer devices.

16. The network device of claim 15, wherein to determine the load for the plurality of shared printer devices, the machine readable instructions are further to cause the hardware processor to determine the load responsive to a determination that a session exists with each of the plurality of shared printer devices or a determination that data is being transmitted to the plurality of shared printer devices from another client device.

17. The network device of claim 15, wherein to filter the plurality of shared printer devices, the machine readable instructions are further to cause the one or more network devices to filter the plurality of shared printer devices based on the one or more device conditions, the load for the plurality of shared printer devices, and a role of the user to obtain the filtered plurality of shared printer devices.

18. The network device of claim 15, wherein the machine readable instructions are further to cause the one or more network devices to:

order the identified set of available shared printer devices in an order from smallest load to largest load and to transmit information identifying the set of available shared printer devices according to the ordered arrangement of the set of available shared printer devices.

19. The network device of claim 15, wherein the machine readable instructions are further to cause the one or more network devices to:

transmit a status query to the plurality of shared printer devices for the load of the plurality of shared printer devices.

20. The network device of claim 19, wherein the machine readable instructions are further to cause the one or more network devices to:

send the status query based on a load associated with the particular service.

* * * * *